United States Patent
Zhou

(10) Patent No.: US 9,118,267 B2
(45) Date of Patent: Aug. 25, 2015

(54) FAN CONTROL CIRCUIT

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Hai-Qing Zhou, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 47 days.

(21) Appl. No.: 14/142,912

(22) Filed: Dec. 29, 2013

(65) Prior Publication Data

US 2014/0184126 A1 Jul. 3, 2014

(30) Foreign Application Priority Data

Dec. 28, 2012 (CN) .......................... 2012 1 0582812

(51) Int. Cl.
*H02P 7/00* (2006.01)
*H02P 7/29* (2006.01)

(52) U.S. Cl.
CPC ... *H02P 7/00* (2013.01); *H02P 7/29* (2013.01)

(58) Field of Classification Search
CPC .......................................................... H02P 7/00
USPC .................................. 318/503, 494, 599, 560
See application file for complete search history.

(56) References Cited

U.S. PATENT DOCUMENTS 6,381,406 B1 * 4/2002 Smith et al. .................... 318/799

* cited by examiner

*Primary Examiner* — David S Luo
(74) *Attorney, Agent, or Firm* — Novak Druce Connolly Bove + Quigg LLP

(57) ABSTRACT

A fan control circuit includes a hardware controller, a rectifier circuit, first to third electronic switches, and a fan. When the hardware controller outputs a pulse width modulation (PWM) signal to the rectifier circuit and the fan, the rectifier circuit transforms the PWM signal into a direct current (DC) voltage and outputs the DC voltage to the first electronic switch. The first electronic switch is turned on, and the second and third electronic switches are turned off. A rotation speed of the fan is controlled by the PWM signal received from the hardware controller. When the hardware controller does not output the PWM signal, the first electronic switch is turned off, the second and third electronic switches are turned on, a DC power supply supplies power to the fan through the third electronic switch, and the fan rotates at full speed.

8 Claims, 1 Drawing Sheet

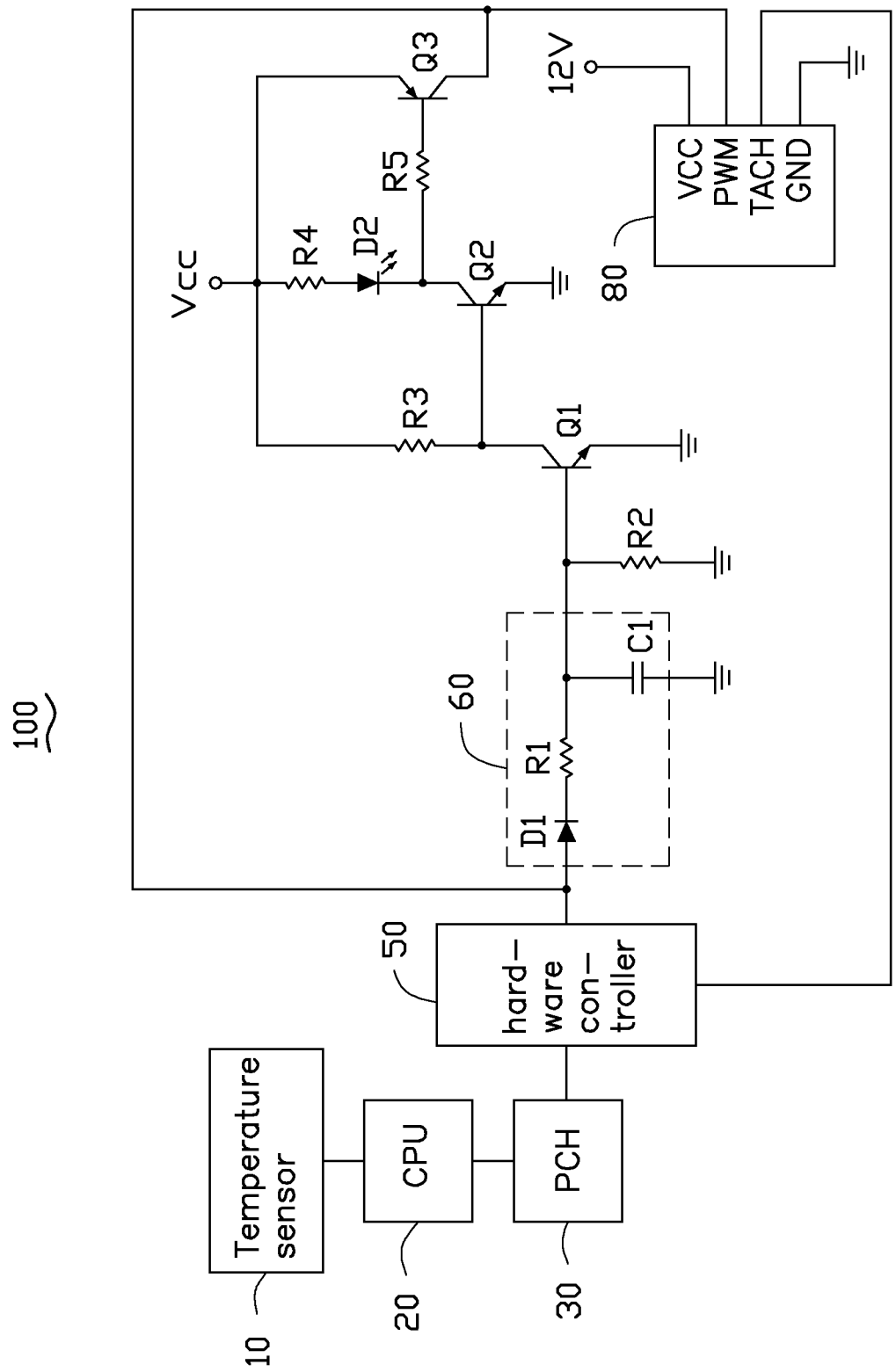

FAN CONTROL CIRCUIT

BACKGROUND

1. Technical Field

The present disclosure relates to control circuits, and particularly to a fan control circuit.

2. Description of Related Art

In most computer systems, hardware controllers function as temperature monitoring elements, to transmit pulse width modulation (PWM) signals to adjust a rotation speed of fans, according to a temperature of the computer systems. However, if the hardware controllers operate abnormally and fail to transmit the PWM signals, the fans will stop running. Therefore, heat cannot be dissipated timely, which may affect normal operation of the computer systems and damage the computer systems.

BRIEF DESCRIPTION OF THE DRAWING

Many aspects of the present disclosure can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

The figure is a circuit diagram of an embodiment of a fan control circuit.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references can mean "at least one."

The figure shows an embodiment of a fan control circuit 100 for controlling a rotation speed of a fan 80. In one embodiment, the fan control circuit 100 includes a temperature sensor 10, a central processing unit (CPU) 20, a platform controller hub (PCH) 30, a hardware controller 50, a rectifier circuit 60, three electronic switches Q1-Q3, four resistors R2-R5, and a light emitting diode (LED) D2. The rectifier circuit 60 includes a diode D1, a resistor R1, and a capacitor C1. The fan 80 includes a power pin VCC, a control pin PWM, a detecting pin TACH, and a ground pin GND. Each of the electronic switches Q1-Q3 includes a first terminal, a second terminal, and a third terminal In one embodiment, the fan control circuit 100 is used in a computer system.

The CPU 20 is electrically connected to the temperature sensor 10 and the PCH 30. The hardware controller 50 is electrically connected to the PCH 30, an anode of the diode D1, the control pin PWM of the fan 80, and the detecting pin TACH of the fan 80. A cathode of the diode D1 is grounded through the resistor R1 and the capacitor C1 in that order. The first terminal of the electronic switch Q1 is electrically connected to a node between the resistor R1 and the capacitor C1, and grounded through the resistor R2. The second terminal of the electronic switch Q1 is electrically connected to a direct current (DC) power supply Vcc through the resistor R3. The third terminal of the electronic switch Q1 is grounded. The first terminal of the electronic switch Q2 is electrically connected to the second terminal of the electronic switch Q1. The second terminal of the electronic switch Q2 is electrically connected to a cathode of the LED D2. The third terminal of the electronic switch Q2 is grounded. An anode of the LED D2 is electrically connected to the DC power supply Vcc through the resistor R4. The first terminal of the electronic switch Q3 is electrically connected to the second terminal of the electronic switch Q2 through the resistor R5. The second terminal of the electronic switch Q3 is electrically connected to the control pin PWM of the fan 80. The third terminal of the electronic switch Q3 is electrically connected to the DC power supply Vcc. The power pin VCC of the fan 80 is electrically connected to a DC power supply 12V. The ground pin of the fan is grounded.

In use, the temperature sensor 10 senses a temperature of the computer system, and outputs the sensed temperature to the CPU 20. The CPU 20 outputs a control signal to the hardware controller 50 through the PCH 30 according to the sensed temperature received from the temperature sensor 10. If the hardware controller 50 operates normally, the hardware controller 50 outputs a pulse width modulation (PWM) signal having a duty cycle corresponding to the control signal to the rectifier circuit 60 and the control pin PWM of the fan 80. The rectifier circuit 60 transforms the PWM signal into a DC voltage, and outputs the DC voltage to the first terminal of the electronic switch Q1. The electronic switch Q1 is turned on after receiving the DC voltage output by the rectifier circuit 60, and the electronic switches Q2 and Q3 are turned off. Thus, the LED D2 is not lit up, which indicates that the hardware controller 50 operates normally. The rotation speed of the fan 80 is controlled by the PWM signal received from the hardware controller 50.

If the hardware controller 50 does not operate normally and does not output the PWM signal, the rectifier circuit 60 does not output the DC voltage. Thus, the electronic switch Q1 stays turned off, and the electronic switches Q2 and Q3 are turned on. When the electronic switches Q2 and Q3 are turned on, the LED D2 is lit up to indicate that the hardware controller 50 does not output the PWM signal and should be repaired or replaced. Furthermore, when the switches Q2 and Q3 are turned on, the DC power supply Vcc supplies power to the control pin PWM of the fan 80 through the electronic switch Q3, so that the fan 80 rotates at full speed. Therefore, even if the hardware controller 50 does not output the PWM signal, the fan 80 continues to operate to dissipate heat from the computer system.

In one embodiment, each of the electronic switches Q1 and Q2 is an npn-type bipolar junction transistor (BJT), and the electronic switch Q3 is a pnp-type BJT. The first terminal, the second terminal, and the third terminal of each of the electronic switches Q1 and Q2 are a base, a collector, and an emitter of the npn-type BJT, respectively. The first terminal, the second terminal, and the third terminal of the electronic switch Q3 are a base, a collector, and an emitter of the pnp-type BJT, respectively. In other embodiments, each of the electronic switches Q1 and Q2 can be an n-channel metal-oxide semiconductor field-effect transistor or another type of electronic switch having similar functions. The electronic switch Q3 can be a p-channel metal-oxide semiconductor field-effect transistor or another type of electronic switch having similar functions. The LED D2 can be replaced by a buzzer or another type of indicator having similar functions. The LED D2 can be omitted if power consumption and operation states of the hardware controller 50 are not essential to regulate.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A fan control circuit comprising:
a first resistor and a second resistor;
a fan comprising a control pin;
a hardware controller connected to the control pin of the fan;
a rectifier circuit connected to the hardware controller;
a first electronic switch comprising a first terminal connected to the rectifier circuit, a second terminal connected to a direct current (DC) power supply through the first resistor, and a third terminal grounded;
a second electronic switch comprising a first terminal connected to the second terminal of the first electronic switch, a second terminal connected to the DC power supply through the second resistor, and a third terminal grounded; and
a third electronic switch comprising a first terminal connected to the second terminal of the second electronic switch, a second terminal connected to the control pin of the fan, and a third terminal connected to the DC power supply;
wherein when the hardware controller outputs a pulse width modulation (PWM) signal to the rectifier circuit and the control pin of the fan, the rectifier circuit transforms the PWM signal into a DC voltage and outputs the DC voltage to the first electronic switch, the first electronic switch is turned on, the second and third electronic switches are turned off, a rotation speed of the fan is controlled by the PWM signal received from the hardware controller; and
wherein when the hardware controller does not output the PWM signal, the rectifier circuit does not output the DC voltage, the first electronic switch is turned off, the second and third electronic switches are turned on, the DC power supply supplies power to the control pin of the fan through the third electronic switch, and the fan rotates at full speed.

2. The fan control circuit of claim 1, wherein the rectifier circuit comprises a diode, a capacitor and a third resistor, the diode comprises an anode connected to the hardware controller, and a cathode grounded through the third resistor and the capacitor in that order.

3. The fan control circuit of claim 2, further comprising a fourth resistor, wherein the first terminal of the first electronic switch is connected to a node between the third resistor and the capacitor, and is grounded through the fourth resistor.

4. The fan control circuit of claim 3, wherein the first electronic switch is an npn-type bipolar junction transistor (BJT), and the first terminal, the second terminal, and the third terminal of the first electronic switch respectively a base, a collector, and an emitter of the npn-type BJT.

5. The fan control circuit of claim 1, further comprising a light emitting diode (LED) comprising an anode connected to the DC power supply through the second resistor, and a cathode connected to the second terminal of the second electronic switch, wherein when the second electronic switch is turned on, the LED is lit up.

6. The fan control circuit of claim 5, further comprising a fifth resistor, wherein the first terminal of the third electronic switch is connected to the second terminal of the second electronic switch through the fifth resistor.

7. The fan control circuit of claim 6, wherein the second electronic switch is an npn-type BJT, and the first terminal, the second terminal, and the third terminal of the first electronic switch respectively a base, a collector, and an emitter of the npn-type BJT.

8. The fan control circuit of claim 6, wherein the third electronic switch is a pnp-type BJT, and the first terminal, the second terminal, and the third terminal of the third electronic switch respectively a base, a collector, and an emitter of the pnp-type BJT.

* * * * *